United States Patent
Setsuda

[11] Patent Number: 6,152,096
[45] Date of Patent: Nov. 28, 2000

[54] STORAGE BATTERY PROTECTION BY ENGINE AIR INTAKE SYSTEM

[75] Inventor: David Joseph Setsuda, Farmington Hills, Mich.

[73] Assignee: Visteon Global Technologies, Inc., Dearborn, Mich.

[21] Appl. No.: 09/348,928

[22] Filed: Jul. 6, 1999

[51] Int. Cl.⁷ .................................................. B60R 16/04
[52] U.S. Cl. .................................. 123/184.21; 180/68.5; 123/184.57
[58] Field of Search ........................ 123/184.21, 195 C, 123/198 E, 184.57; 180/68.5, 68.2, 68.3; 429/42, 175

[56] References Cited

U.S. PATENT DOCUMENTS

| | | | |
|---|---|---|---|
| 4,126,734 | 11/1978 | Walters | 429/71 |
| 4,976,327 | 12/1990 | Abujudom, II et al. | 180/68.2 |
| 5,031,712 | 7/1991 | Karolek et al. | 180/68.2 |
| 5,040,495 | 8/1991 | Harada et al. | 123/184.57 |
| 5,082,075 | 1/1992 | Karolek et al. | 180/68.2 |
| 5,215,834 | 6/1993 | Reher et al. | 429/62 |
| 5,278,002 | 1/1994 | Hiers | 429/175 |
| 5,320,190 | 6/1994 | Naumann et al. | 180/68.2 |
| 5,460,234 | 10/1995 | Matsuura et al. | 180/68.5 |
| 5,542,489 | 8/1996 | Allison et al. | 180/68.5 |
| 5,547,036 | 8/1996 | Gawaskar et al. | 180/68.5 |
| 5,636,701 | 6/1997 | Norman et al. | 180/68.5 |
| 5,913,295 | 6/1999 | Sadr et al. | |

*Primary Examiner*—Marguerite McMahon
*Attorney, Agent, or Firm*—Larry I. Shelton

[57] ABSTRACT

Duct structure (22) is disposed in an engine compartment (10) of an automotive vehicle and comprises a main air passageway (32) that runs from an intake (34) at one end to an outlet (36) at an opposite end. A section of the length of passageway (32) is disposed to run alongside a vertical wall of the casing of a battery (24) that is toward an engine (12). Heat impinging on the duct structure is dissipated to the airflow through the passageway. Various features are integrated with the duct structure including resonators (38, 40), a deflector (48), and a battery enclosure (50) for containment of electrolyte that is accidentally spewed or leaked from the battery casing so that the liquid does not entrain with the intake airflow to the engine.

17 Claims, 3 Drawing Sheets

STORAGE BATTERY PROTECTION BY ENGINE AIR INTAKE SYSTEM

BACKGROUND OF THE INVENTION

1. Field of the Invention

This invention relates to automotive vehicles that are powered by internal combustion engines and that have electrical systems containing storage batteries.

2. Background Information

Lead-acid storage batteries are commonly used in electrical systems of automotive vehicles to provide electric energy for operating starter motors to crank engines that power the vehicles. During running of an engine, an alternator that is driven by the engine keeps the battery recharged through an electric regulator. It is generally desirable for the battery to be disposed in proximity to the engine so that ohmic losses can be minimized during cranking when current draw on the battery is quite high. Over time, such a battery ages, and eventually reaches a point where it is incapable of sustaining sufficient charge to serve the needs of a vehicle.

Heat is a contributor to battery aging, and because an engine in an engine compartment can at times be a source of significant heat, various arrangements have heretofore been proposed to shield the battery from engine heat. It is believed that the following U.S. Patents are representative of the state of the art: U.S. Pat. No. 4,126,734; U.S. Pat. No. 4,976,327; U.S. Pat. No. 5,031,712; U.S. Pat. No. 5,082,075; U.S. Pat. No. 5,215,834; U.S. Pat. No. 5,320,190; and U.S. Pat. No. 5,542,489.

It is generally known to associate an engine intake system with an internal combustion engine air intake system with a storage battery so that the battery is shielded by heat dissipation to the intake airflow. Certain of the arrangements in the above patents utilize blowers and/or other moving parts to accomplish their objectives. It is believed that such components increase the cost of a battery protection system and that it would therefore be beneficial if meaningful battery protection could be accomplished without such components.

SUMMARY OF THE INVENTION

In one respect, the present invention relates to engine air intake systems that provide storage battery protection without using devoted components that have moving parts. Stated another way, the invention relates to air intake structures that are associated with storage batteries in engine compartments of automotive vehicles and that perform active cooling of storage batteries by dissipating heat to engine intake airflow, but through passive structures that do not use devoted components having moving parts. It is believed that such passive structures provide favorable cost advantages and fewer reliability issues in comparison to systems like those in some of the above patents.

A further aspect of the invention relates to the integration, with such passive structures, of certain features useful to the engines. One integration feature relates to the association of one or more engine intake system resonators in thermally protective relation to a storage battery in an engine compartment. Another integration feature relates to the containment of electrolyte that may accidentally escapes from a storage battery due to causes such as vent spewing or casing failure.

A general aspect of the within claimed invention relates to an engine compartment of an automotive vehicle that houses an internal combustion engine having an air intake system and that also contains an electrical system storage battery in spaced apart relation to the engine; duct structure that forms a portion of the air intake system and comprises an inlet at which intake air enters and a passageway that conveys the intake air from the inlet, lengthwise through the passageway, to an outlet; a portion of the length of the passageway being disposed in covering relation to a wall of the battery that is toward the engine; and a branch that is disposed in covering relation to another wall of the battery and that comprises a space that is open to the passageway, but otherwise closed.

Another general aspect relates to an engine compartment of an automotive vehicle that houses an internal combustion engine having an air intake system and that also contains a electrical system storage battery in spaced apart relation to the engine; duct structure that forms a portion of the air intake system and comprises an inlet at which intake air enters and a primary passageway that conveys the intake air from the inlet, lengthwise through the passageway, to an outlet; a portion of the length of the primary passageway being disposed in covering relation to a wall of the battery that is toward the engine; and a secondary passageway that is disposed in covering relation to another wall of the battery and that branches from the first passageway, comprising an entrance upstream of the portion of the length of the primary passageway that is disposed in covering relation to a wall of the battery that is toward the engine and an exit downstream of the portion of the length of the primary passageway that is disposed in covering relation to a wall of the battery that is toward the engine; and in which the primary passageway comprises a non-movable deflector wall that is disposed immediately upstream of the entrance of the secondary passageway and is effective at a relatively lower flow rate to cause proportion the flow through the two passageways such that the proportion of flow through the primary passageway to the flow through the secondary passageway is relatively larger than is the proportion of flow through the primary passageway to flow through the secondary passageway when the flow rate is relatively higher.

Still another general aspect relates to an engine compartment of an automotive vehicle that houses an internal combustion engine having an air intake system and that also contains an electrical system storage battery in spaced apart relation to the engine; duct structure that forms a portion of the air intake system and comprises an inlet at which intake air enters and a passageway that conveys the intake air from the inlet, lengthwise through the passageway, to an outlet; a portion of the length of the passageway being disposed in covering relation to an enclosure that associates with a tray on which the battery is supported to enclose the battery; the enclosure comprising a top that covers a top of the battery and a perimeter wall extending downward from the top to the tray in covering relation to the perimeter of the battery.

Other general and more specific aspects will been set forth in the ensuing description and claims.

BRIEF DESCRIPTION OF THE DRAWINGS

The drawings that will now be briefly described are incorporated herein to illustrate a preferred embodiment of, the invention and a best mode presently contemplated for carrying out the invention.

DESCRIPTION OF THE PREFERRED EMBODIMENT

Figure 1:
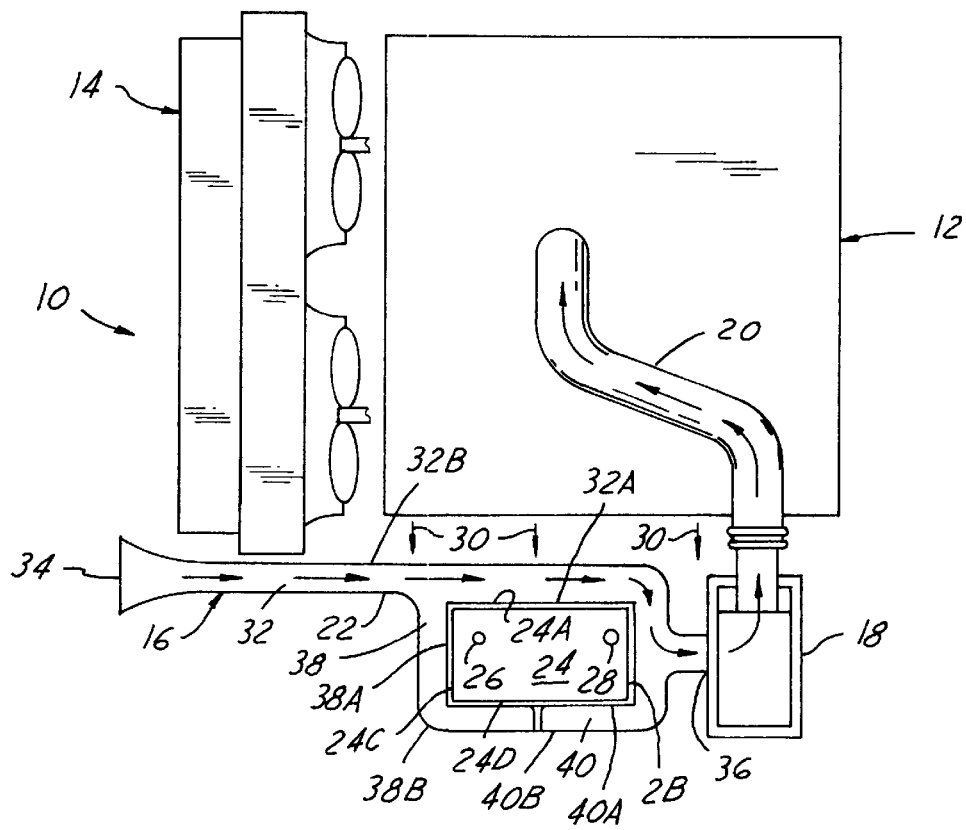
FIG. 1 is a top plan view, somewhat diagrammatic in nature, of a portion of an engine compartment relevant to the present invention.

FIG. 1 shows an engine compartment 10 of an automotive vehicle comprising an internal combustion engine 12. Engine compartment 10 is at the front of the vehicle. A cooling module 14 that forms a portion of a liquid cooling system of engine 12 is disposed at the front of engine compartment 10.

An air intake system 16 through which fresh air is conveyed into combustion chambers of engine 12 is also disposed within engine compartment 10. The illustrated air intake system 16 includes an air box 18 upstream of engine 12 and containing a particulate filter for filtering certain particulates from the intake airflow. Air box 18 is disposed to one side of engine 12, being mounted on an interior panel of a left front fender of the vehicle in the example of FIG. 1. Filtered air passes from an outlet of air box 18 through a conduit 20 to a manifold of engine 12 for distributing filtered air to the engine combustion chambers.

Air box 18 also has an inlet through which unfiltered air, i.e. dirty air, enters. Air is supplied to the air box inlet through a duct structure 22 that is operatively associated with a D.C. storage battery 24 of the vehicle's electrical system in accordance with principles of the present invention.

By itself, battery 24 is conventional, comprising a generally rectangular casing having positive and negative posts 26, 28 respectively via which it operatively connects with the electrical system. Battery 24 is typically a lead-acid storage battery that has substantial weight, and therefore supported in a secure, stable manner on weight-bearing structure of the vehicle, such as an underlying battery tray. Within engine compartment 10, battery 24 is exposed to whatever ambient temperature is present there. When engine 10 is hot, heat may also radiate toward battery 24, as portrayed by arrows 30.

By constructing and arranging duct structure 22 in accordance with principles of the invention, battery 24 may be protectively shielded at least to some extent from engine compartment influences that tend to raise battery temperature. Accordingly, it is believed that the invention provides a meaningful degree of beneficial battery cooling at elevated engine compartment temperatures.

Duct structure 22 is constructed from suitable polymeric material molded by known molding methods to a formed shape for fitting into engine compartment 10 in association with battery 24 in ways to be described. Duct structure 22 comprises a main air passageway 32 that runs from an intake 34 at one end, to an outlet 36 at an opposite end. Outlet 36 fits to the air box inlet at a fluid-tight joint so that air entering intake 34 passes freely through passageway 32 and into the interior of air box 18. A section of the length of passageway 32 is disposed to run alongside a side wall 24A of the battery casing that is toward engine 12. Where casing side wall 24A joins an end wall 24B of the casing, passageway 32 makes a right angle bend that extends about halfway along end wall 24B. The passageway then makes an opposite right angle bend to the air box inlet. The structure of passageway 32 that runs along casing side wall 24A and a portion of end wall 24B comprises inner and outer walls 32A, 32B respectively of duct material, the inner and outer walls being separated by the open interior of the passageway. Desirably the vertical dimension of passageway 32 equals or exceeds that of the casing side and end wall so that it covers the full height of the side of the casing, but a passageway that is somewhat shorter may still be effective for the intended purpose.

When engine 12 is operating, intake airflow passes through passageway 32, into air box 18 where it is filtered, and through conduit 20 into the engine intake manifold.

Duct structure 22 provides a physical barrier to engine heat, both radiant and convective, that would otherwise impinge directly on side and end walls 24A, 24B of the battery casing. Some of that heat will be absorbed by the duct structure material and dissipated to the intake airflow through passageway 32, so that the thermal energy reaching battery 24 is less than it would be in the absence of the protective effect of passageway 32. It is therefore believed that the presence of duct structure 22 can aid in limiting the rise of temperatures that tend to degrade leadacid storage batteries. For increasing efficiency, air inlet 34 should be situated at a location where the relatively coolest air can be drawn.

Figure 2:
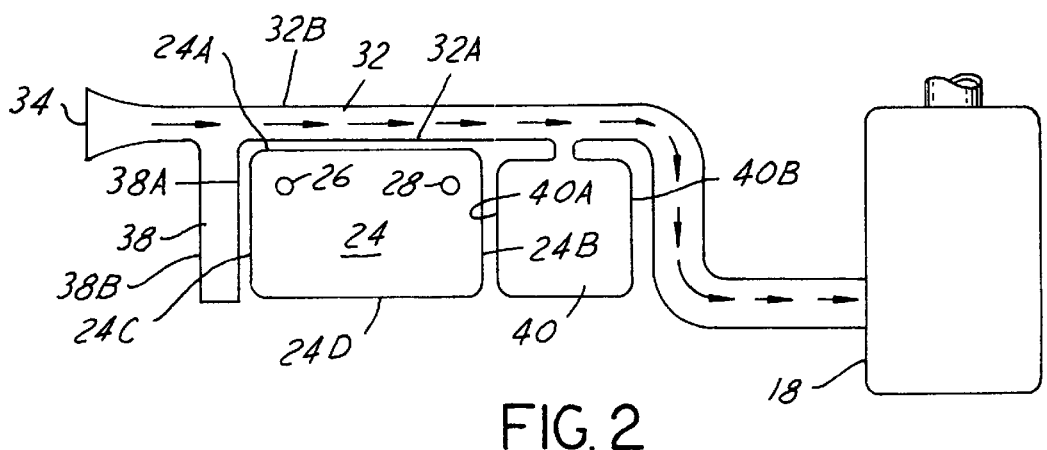
FIG. 2 is a view of a portion of FIG. 1 illustrating a modified form.

A further aspect of duct structure 22 relates to the inclusion of branches 38, 40 that are open to passageway 32, but otherwise closed, and that comprise additional inner and outer walls disposed in covering relation to those portions of the battery casing side and end walls not covered by passageway 32. Branch 38 comprises a set of inner and outer walls 38A, 38B disposed in covering relation to casing end wall 24C and an adjoining portion of casing side wall 24D. Branch 40 comprises a set of inner and outer walls 40A, 40B is disposed in covering relation to a portion of casing end wall 24B and an adjoining portion of casing side wall 24D. Like passageway 32, each branch 38, 40 has a rectangular transverse cross section, and preferably a height substantially equal to that of the battery casing. Although branches 38, 40 are perhaps not as directly exposed to engine 12 as passageway 32 is, they are still capable of some contribution to thermal protection of battery 24.

Where each branch joins with passageway 32, it is open to the passageway, but at its opposite end, it is closed. Hence, neither branch is capable of conducting throughflow. However, because each branch comprises a closed volume that is open to passageway 32, it may be endowed with suitable features that enable it to also function as a resonator in the engine air intake system for performing a desired tuning function appropriate to the particular engine. Specific constructional details for any particular type of resonator desired to be integrated in the inventive air intake and battery protection system are known to designers of engine intake systems. One example of a dual resonator system is shown by FIG. 2 where branch 38 is constructed as a quarter-wave resonator and branch 40 as a Helmholtz resonator. Depending on specific requirements for any given design, one or more resonators may be integrated in a system, and the entirety, or only a fraction of the entirely, of the battery casing perimeter may be covered. Thus one resonator 38 is covering one casing end wall, and the other resonator 40 is covering the opposite end wall in FIG. 2, but the side wall facing away from the engine is uncovered.

Figure 3:
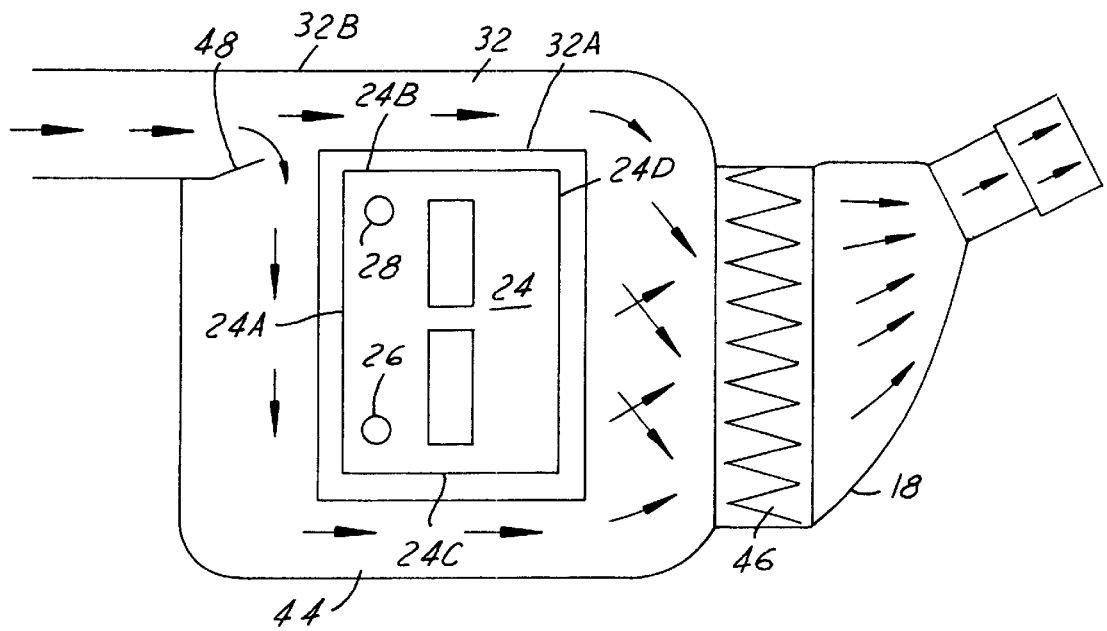
FIG. 3 is a view of another modified form on an enlarged scale.

FIG. 3 discloses a further form of the invention, using like numbers from FIGS. 1 and 2 to designate like parts. Rather than having a single passageway 32 and resonators as in the embodiments of FIGS. 1 and 2, the duct structure 22 of FIG. 3 comprises a second passageway 44 that is in parallel flow relation to passageway 32. Passageway 32 may be considered a primary passageway and passageway 44, a secondary passageway. Both passageways have inner and outer walls and rectangular transverse cross sections for thermal shielding of battery 24. Battery 24 i disposed in an orientation 90° from its orientation in FIGS. 1 and 2, and passageway 32 runs generally along casing end wall 24B and casing side wall 24D, while passageway 44 runs generally along casing side wall 24A and casing end wall 24C. Air box 18 comprises a rectangular filter 46 that is open to both passageways, facing in the general direction of casing side wall 24D.

Where passageway 44 branches from passageway 32, the inner wall of the latter is formed to have a deflector 48 that angles a short distance into the interior of passageway 32 immediately ahead of the entrance to passageway 44. Deflector 48 runs the full height of passageway 32 and serves to constrict passageway 32 immediately ahead of passageway 44. It is believed that during low engine speeds, engine idle in particular, when the intake flow is relatively low and engine temperatures may become relatively high due to reduced coolant circulation through module 14, the restrictive effect of deflector 48 causes an acceleration of the intake airflow that tends to maintain the intake airflow substantially straight through passageway 32 rather than allowing the flow to more equally divide between the two passageways. However, at higher engine speeds, the parallel passageways together provide a larger flow area for collectively handling the increased flowrate. Hence, at low engine speeds, the intake flow is forced to pass through that portion of the duct structure directly between the engine and the battery where it can be most beneficial. This capability is imparted to the duct structure without use of moving parts to proportion flow through the passageways. And at higher engine speeds, the availability of parallel flow passages provides less restriction than just one of the passages. The primary passageway 32 may be considered to comprise non-movable deflector wall 48 disposed immediately upstream of the entrance of secondary passageway 44. The arrangement is effective at a relatively lower flow rate to proportion the flow through the two passageways such that the proportion of flow through the primary passageway to the flow through the secondary passageway is relatively larger than is the proportion of flow through the primary passageway to flow through the secondary passageway when the flow rate is relatively higher.

Figure 4:
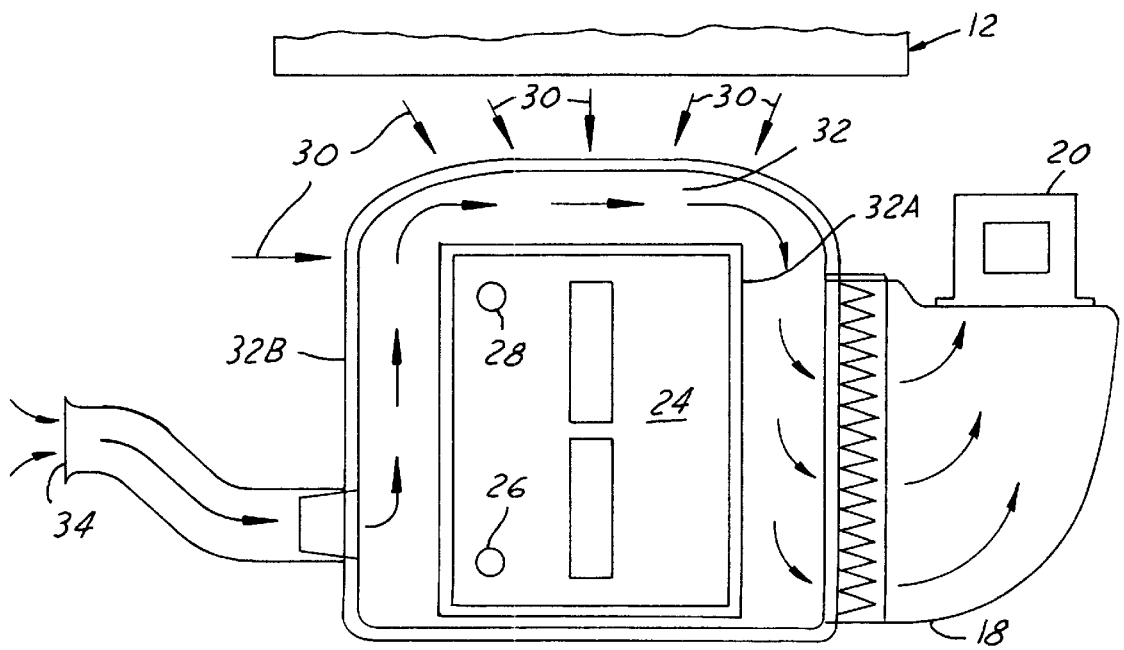
FIG. 4 is a view of still another modified form also on an enlarged scale.

FIG. 4 discloses another form using like numbers from FIGS. 1–3 to designate like parts. The single passageway 32 now runs along three of the four walls of the side of battery 24, as shown, with the fourth wall 24C facing away directly away from engine 12.

Figure 5:
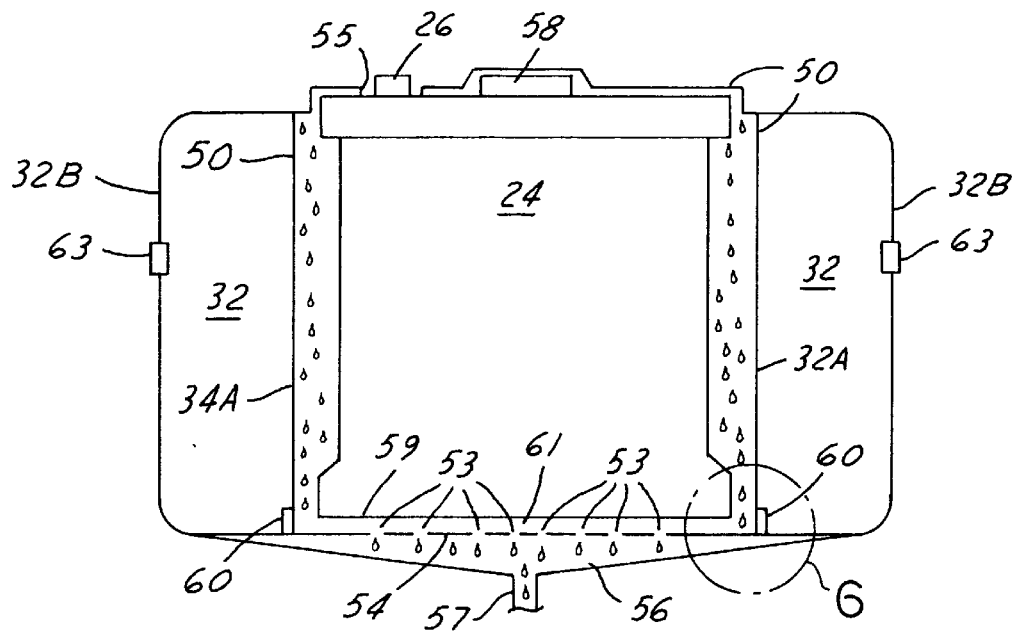
FIG. 5 is a vertical cross section view through a portion of yet another modified form.
Figure 6:
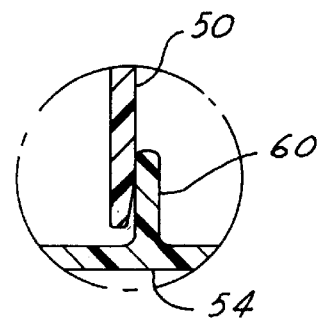
FIG. 6 is an enlarged view in circle 6 of FIG. 5.

FIGS. 5 and 6 disclose yet another form that possesses a battery fluid containment feature not present in any of the previous forms, although as will be appreciated, this containment feature may be embodied in any of the previous forms. Should battery fluid escape the battery casing for reasons such as spewing from a vent or a failure of the casing, it is desirable that the liquid electrolyte not entrain with the intake airflow through passageway 32. Battery 24 is therefore housed within an enclosure 50 fabricated from acid-resistant material. Enclosure 50 is constructed to have a generally rectangular shape just large enough for battery 24 to fit inside. It has a generally horizontal top wall covering the top of the battery casing and a vertical wall disposed around the side and end walls of the battery casing, but is open at the bottom. Clearance space 52 is provided between the vertical enclosure wall and the battery.

Battery 24 is secured on a horizontal tray 54, also of acid-resistant material. Tray 54 is perforated at certain locations so that fluid falling on it can drain through perforations 53 to a sump 56 directly beneath tray 54. Hence, if electrolyte escapes the battery casing, it will be contained by enclosure 50 and drain by gravity into sump 56. The floor of sump 56 is sloped to a low point containing the entrance of a conduit 57 that carries the electrolyte to any suitable location where it can drain by gravity onto the ground.

Where battery 24 rests on tray 54, the tray is corrugated so as to provide a series of risers 59 separated by channels 61. The bottom surface of battery 24 rests on the top surfaces of risers 59. Metal parts of battery hold-downs features are situated in locations where escaped electrolyte will drain away from them.

To promote free drainage of liquid within enclosure 50, it is vented to atmosphere at or near its top by small open areas, or simply by suitable clearance 55 in the fit of its top wall to the top of battery 24. Notice that the battery cap 58 is covered in such a way that spewed liquid will be substantially contained on the top of the battery where it can spill over the edge and run down the side and or end walls of the casing through space 52.

Tray 54 comprises a short upright wall 60 that has a rectangular shape just larger than the perimeter of the bottom edge of enclosure 50. FIG. 6 shows that the installed enclosure fits to tray 54 in with the lower marginal edge of the enclosure in closely telescopically overlapping relationship to wall 60 such that such that a tortuous path that resists escape of liquid between the two parts is created. This attachment-free feature allows enclosure 50 to be conveniently installed and removed while providing satisfactory liquid containment.

Another advantageous feature of enclosure 50, as illustrated in FIG. 5, is its integration with the duct structure forming passageway 32. The vertical side wall of enclosure 50 is shown to form inner wall 32A where the duct structure adjoins the enclosure. Also, the top wall and an immediately adjoining, downwardly extending portion of the outer wall 32B of the duct structure are integrally formed with enclosure 50 where the duct structure adjoins the enclosure. The bottom wall and an immediately adjoining, upwardly extending portion of outer wall 32B are shown to be integrally formed with tray 54 where the duct structure adjoins enclosure 50. Thus a lower portion of the outer wall 32B is formed integrally with tray 54 and an upper portion, with enclosure 50, and when the enclosure is placed over the tray to enclose the battery, edges of the respective portions come together at a joint 63 that maintains substantial the integrity of the duct structure. The joint along wall 60 also maintains substantial duct structure integrity.

Because of the telescopic fits in the joints between tray 54 and enclosure 50, they can be designed to accommodate industry-accepted manufacturer-to-manufacturer variations in battery casing dimensions.

Specific constructional details of any particular embodiment of the present invention are apt to depend to some extent on vehicle design factors such as engine compartment size and placement of the battery in relation to the engine. For example, passageway 32 and enclosure 50 may share a common wall. The inventive principles contemplate that certain features of certain of the illustrated embodiments may be integrated with certain features of other illustrated embodiments. Accordingly, while a presently preferred embodiment has been illustrated and described, it is to be appreciated that the invention may be practiced in various forms within the scope of the following claims.

What is claimed is:

1. In an engine compartment of an automotive vehicle that houses an internal combustion engine having an air intake system and that also contains an electrical system storage battery in spaced apart relation to the engine, the storage battery comprising a casing having an exterior containing positive and negative battery terminals via which the storage battery connects to an electrical system of the vehicle;

duct structure that forms a portion of the air intake system and comprises an inlet at which intake air enters and a passageway that conveys the intake air from the inlet, lengthwise through the passageway, to an outlet;

a portion of the length of the passageway being disposed in covering relation to an enclosure that associates with a tray on which the battery casing is supported to enclose the battery casing;

the enclosure comprising a top that covers a top of the battery casing and a perimeter wall extending downward from the top to the tray in covering relation to the perimeter of the battery casing.

2. In an engine compartment as set forth in claim 1, the tray comprising an upright perimeter wall with which a bottom edge margin of the perimeter wall of the enclosure has a snug telescopic fit.

3. In an engine compartment as set forth in claim 1, the enclosure comprising an atmospheric vent that allows free drainage of liquid within the enclosure, and the tray comprising perforations providing for liquid to drain through the tray.

4. In an engine compartment as set forth in claim 1, the tray and the enclosure comprising respective wall portions that come together at a joint to cooperatively form the portion of the passageway that is disposed in covering relation to the enclosure.

5. In an engine compartment as set forth in claim 4, the tray and the enclosure comprising respective wall portions that are constructed and arranged to accommodate industry-accepted manufacturer-to-manufacturer variations in battery casing dimensions.

6. In an engine compartment as set forth in claim 1, a portion of the length of the passageway being disposed in covering relation to a wall of the battery enclosure that is toward the engine; and the duct structure further comprising a branch that is disposed in covering relation to another wall of the battery enclosure and that comprises a space that is open to the passageway, but otherwise closed.

7. In an engine compartment as set forth in claim 6, the duct structure comprising another branch that is disposed in covering relation to a further wall of the battery enclosure and that comprises a space that is open to the passageway, but otherwise closed.

8. In an engine compartment as set forth in claim 7, at least one of the branches being constructed and arranged to form a resonator for tuning the air intake system to operation of the engine.

9. In an engine compartment as set forth in claim 8, both of the branches being constructed and arranged to form respective diverse resonators, each for tuning the air intake system in a manner diverse from the other to operation of the engine.

10. In an engine compartment as set forth in claim 7, one branch being open to the passageway upstream of a location where the other branch is open to the passageway, and collectively, the passageway and the branches being in covering relation to an entire perimeter that comprises the walls.

11. In an engine compartment as set forth in claim 1, the duct structure further comprising a secondary passageway that is disposed in covering relation to another wall of the battery enclosure and that branches from the first-mentioned passageway, comprising an entrance upstream of the portion of the length of the first-mentioned passageway that is disposed in covering relation to a wall of the battery enclosure that is toward the engine and an exit downstream of the portion of the length of the primary passageway that is disposed in covering relation to a wall of the battery enclosure that is toward the engine; and in which the first-mentioned passageway comprises a non-movable deflector wall that is disposed immediately upstream of the entrance of the secondary passageway and is effective at a relatively lower flow rate to proportion the flow through the two passageways such that the proportion of flow through the first-mentioned passageway to the flow through the secondary passageway is relatively larger than is the proportion of flow through the first-mentioned passageway to flow through the secondary passageway when the flow rate is relatively higher.

12. In an engine compartment as set forth in claim 1, the storage battery comprising a battery cap on the casing, and a portion of the enclosure being disposed in covering relation to the battery cap.

13. In an engine compartment as set forth in claim 12, the battery cap being disposed on the top of the casing, and the portion of the enclosure disposed in covering relation to the battery cap being a portion of the top of the enclosure.

14. In an engine compartment as set forth in claim 13, the atmospheric vent being provided in the top of the enclosure by an open clearance in the enclosure top relative to the battery casing.

15. In an engine compartment as set forth in claim 3, the atmospheric vent being provided in the top of the enclosure by an open clearance in the enclosure top relative to the battery casing.

16. In an engine compartment as set forth in claim 3, further including a sump which is disposed in underlying relation to the tray and into which liquid that has passed through the perforations drains.

17. In an engine compartment of an automotive vehicle that houses an internal combustion engine having an air intake system and that also contains an electrical system storage battery in spaced apart relation to the engine;

duct structure that forms a portion of the air intake system and comprises an inlet at which intake air enters and a passageway that conveys the intake air from the inlet, lengthwise through the passageway, to an outlet;

a portion of the length of the passageway being disposed in covering relation to an enclosure that associates with a tray on which the battery is supported to enclose the battery;

the enclosure comprising a top that covers a top of the battery and a perimeter wall extending downward from the top to the tray in covering relation to the perimeter of the battery;

the enclosure comprising an atmospheric vent that allows free drainage of liquid within the enclosure; and the tray comprising perforations providing for liquid to drain through the tray into a sump below the tray.

* * * * *